(12) United States Patent
Simmons et al.

(10) Patent No.: US 11,842,533 B2
(45) Date of Patent: Dec. 12, 2023

(54) PREDICTIVE SEARCH TECHNIQUES BASED ON IMAGE ANALYSIS AND GROUP FEEDBACK

(71) Applicant: Cha-Lin Simmons, Moraga, CA (US)

(72) Inventors: Chia-Lin Simmons, Moraga, CA (US); Rafael Antonio Saavedra, Sunnyvale, CA (US)

(73) Assignee: Chia-Lin Simmons, Moraga, CA (US)

( * ) Notice: Subject to any disclaimer, the term of this patent is extended or adjusted under 35 U.S.C. 154(b) by 753 days.

(21) Appl. No.: 16/918,920

(22) Filed: Jul. 1, 2020

(65) Prior Publication Data

US 2022/0004604 A1  Jan. 6, 2022

Related U.S. Application Data

(63) Continuation-in-part of application No. 15/957,596, filed on Apr. 19, 2018, now abandoned.

(Continued)

(51) Int. Cl.

| | |
|---|---|
| *G06N 5/04* | (2023.01) |
| *G06N 20/00* | (2019.01) |
| *G06F 16/55* | (2019.01) |
| *G06F 16/538* | (2019.01) |
| *G06T 7/90* | (2017.01) |

(Continued)

(52) U.S. Cl.
CPC ............ *G06V 10/95* (2022.01); *G06F 16/535* (2019.01); *G06F 16/538* (2019.01); *G06F 16/55* (2019.01); *G06F 18/214* (2023.01); *G06F 18/24* (2023.01); *G06F 21/31* (2013.01); *G06N 5/04* (2013.01); *G06N 20/00* (2019.01); *G06T 7/11* (2017.01); *G06T 7/90* (2017.01); *G06V 10/7788* (2022.01); *G06V 20/30* (2022.01); *G06V 40/103* (2022.01);

(Continued)

(58) Field of Classification Search
CPC ...... G06F 16/535; G06F 16/538; G06F 16/55; G06F 18/214; G06F 18/24; G06F 21/31; G06N 5/04; G06N 20/00; G06T 7/11; G06T 7/90
See application file for complete search history.

(56) References Cited

U.S. PATENT DOCUMENTS

| | | | |
|---|---|---|---|
| 10,360,224 B2 * | 7/2019 | Mehedy | G06Q 10/10 |
| 2007/0208730 A1 * | 9/2007 | Agichtein | G06F 16/337 |
| | | | 707/999.005 |

(Continued)

*Primary Examiner* — Beemnet W Dada
(74) *Attorney, Agent, or Firm* — Steven R. Vosen

(57) ABSTRACT

The disclosed techniques in artificial intelligence include at least a system and a computer-implemented method for performing a predictive search that compensates for a misclassification. For example, the system can set a user-defined classification of a physical characteristic of the user and retrieve an image captured by a camera device. The system can aggregate binary feedback data submitted by authorized users about the image, predict a classification for the physical characteristic by processing the image with a machine learning (ML) process, and search a database based on a query, which has criteria that includes an indication of the aggregate binary feedback data, the user-defined classification, the predicted classification, and/or data indicative of the user's feedback. The system can then identify a search result that satisfies the query and cause a user device to display a recommendation that includes the search result.

20 Claims, 13 Drawing Sheets

Related U.S. Application Data

(60) Provisional application No. 62/490,508, filed on Apr. 26, 2017.

(51) Int. Cl.
| | |
|---|---|
| *G06V 10/94* | (2022.01) |
| *G06F 21/31* | (2013.01) |
| *G06T 7/11* | (2017.01) |
| *G06F 16/535* | (2019.01) |
| *G06F 18/24* | (2023.01) |
| *G06F 18/214* | (2023.01) |
| *G06V 10/778* | (2022.01) |
| *G06V 20/30* | (2022.01) |
| *G06V 40/10* | (2022.01) |

(52) U.S. Cl.
CPC ............... *G06T 2207/10024* (2013.01); *G06T 2207/20081* (2013.01)

(56) References Cited

U.S. PATENT DOCUMENTS

| | | | |
|---|---|---|---|
| 2010/0169313 A1* | 7/2010 | Kenedy | G06F 16/9535 707/E17.108 |
| 2011/0153361 A1 | 6/2011 | Hanina et al. | |
| 2013/0322528 A1* | 12/2013 | Fuchie | H04N 19/172 375/240.07 |
| 2017/0094304 A1* | 3/2017 | Chou | H04N 19/523 |
| 2017/0265047 A1 | 9/2017 | Royer et al. | |
| 2017/0270593 A1 | 9/2017 | Sherman et al. | |
| 2018/0101238 A1 | 4/2018 | Thomas-Brigden et al. | |
| 2019/0311287 A1 | 10/2019 | Chew et al. | |

* cited by examiner

PREDICTIVE SEARCH TECHNIQUES BASED ON IMAGE ANALYSIS AND GROUP FEEDBACK

CROSS-REFERENCE TO RELATED APPLICATIONS

This application is a continuation-in-part application of U.S. patent application Ser. No. 15/957,596, filed Apr. 19, 2018, which claims priority to U.S. Provisional Patent Application No. 62/490,508, filed Apr. 26, 2017, both of which are incorporated herein in their entirety and by this reference thereto.

TECHNICAL FIELD

The disclosed teachings relate to techniques in artificial intelligence for performing predictive searches based on image analysis and crowd-sourced feedback to compensate for misclassifications.

BACKGROUND

In the context of consumer products such as apparel and other fashion goods or cosmetic goods, making decisions about whether something "fits" and "looks good" requires wearing or using the product beforehand. Hence, brick and mortar retail stores normally have fitting rooms or offer samples of cosmetics to use before purchasing. For individual consumers, discovering apparel that fits and color cosmetics that are aesthetically pleasing on a skin tone does not seem quantitative; rather, discovery typically requires a trial-and-error process that involves guessing and frustration. This experience is further exacerbated with online shopping where products are delivered to consumer homes without being worn or used.

The retail companies or manufacturers bear the brunt of the frustration due to shipping and returns in online environments. The revenue for commercial online platforms that offer apparel, footwear, cosmetics, and accessories is projected to hit almost $100 billion in the United States. And yet, about 30 to 50% or more of these types of consumer goods are returned to online commercial retailers. The loss is not limited to revenue but also waste. Each year, billions of pounds of waste is generated due to returns (e.g., boxes packaging, apparel/fabrics). One way to reduce revenue loss and environmental waste is to enable instant and accurate discovery of products that fit well so that customers are unlikely to return the products. Further, data that describes consumer interest or suitable fit lags for online platforms, retail companies, and apparel manufacturers. Accordingly, identifying a potentially popular trend for clothing and cosmetics is challenging for retail companies and manufacturers.

Some online retailers can recommend proper fitting clothes by requesting user inputs that answer personal questions and by performing automated body scans to obtain body measurement data. These are intrusive processes that are uncomfortable for most shoppers of fashion and cosmetics products. Moreover, the effectiveness of these methods requires candor, which is unlikely given the nature of the information. Further, these methods focus on a "numerical fit" to address inconsistencies of vanity sizing among different brands. However, identifying a matching numerical size is only one issue of many that consumers face when purchasing clothes that fit and enhance appearance.

SUMMARY

The disclosed techniques include at least one system and process to analyze photographic images, of users with products, with machine learning (ML) techniques to discover merchandise that is suitable for the users. In addition to the picture images, the computer-implemented techniques can process inputs including video, user information, location information, device information, social media information, consumer posts and feedback data, to discover relevant data that can aid consumers in decision-making related to purchasing products in the fashion and beauty industries.

The system can discover a product with a suitable fit and appearance for a user by integrating multiple datasets indicative of body shape and size, user feedback data (e.g., voting data), social graph data, and data from other sources to help a user make decisions while shopping online. The image data, metadata, computer vision extracted data, demographic data, consumer data, and/or other data can be processed with one or more ML algorithms to discover misclassifications based on misperceptions by users such as incorrect user input regarding body shape. The discovered data is processed with one or more quantitative analysis tools to then discover suitable products and recommend those products without necessarily ever asking a user intrusive questions or conducting embarrassing body scans. The recommendations can be made without notifying the user about the misperception or can be provided to the user as a discovered insight. As such, the platform can recommend products that a user would not consciously consider buying but which the user data indicates the user does or would prefer wearing. As such, the platform improves the likelihood of purchases, distribution, and manufacturing decisions in near real-time and reduces the cycle of returning merchandise.

BRIEF DESCRIPTION OF THE DRAWINGS

Embodiments of the present technology will be described and explained through the use of the accompanying drawings.

Figure 1:
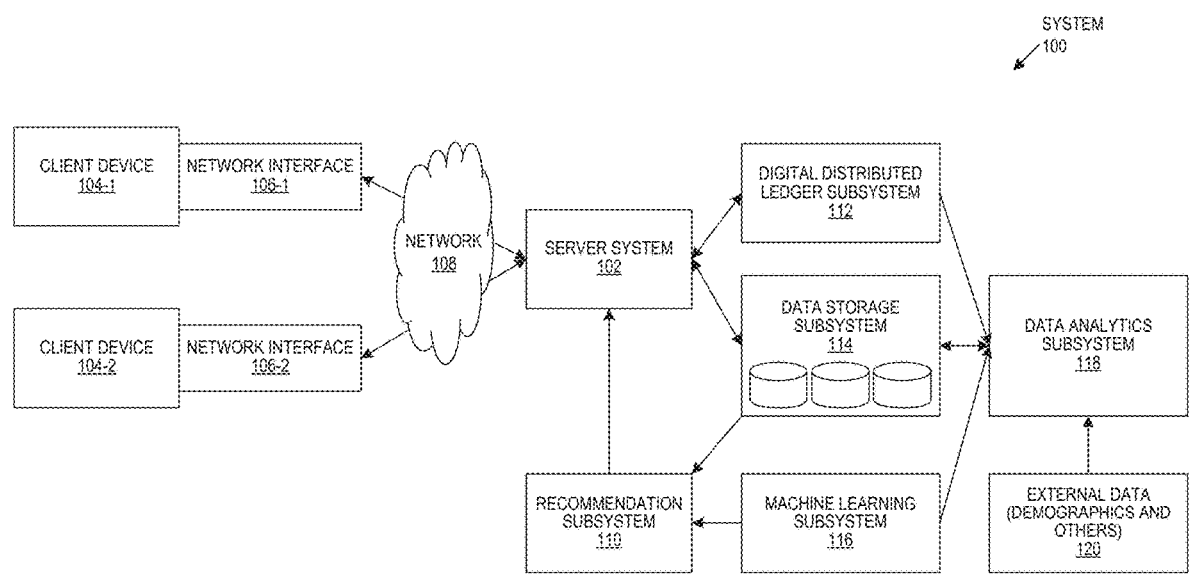
FIG. 1 is a block diagram that illustrates a system that can implement a disclosed platform.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively. As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

The disclosed techniques include at least one system and one process of a platform that improves efficiencies of online portals and supply chains. In one example, at a user level, the system can analyze a picture posted on a platform. The picture includes a user with a product, and the analysis predict suitable merchandise for the user based on the content of the picture and feedback from other users. The platform can detect differences between a user's perception of a personal physical characteristic (e.g., body shape) and the characteristic identified based on the picture. As such, recommended merchandise can be adjusted based on the detected physical characteristic. At a population level, the platform can predict product trends the supports logistics and manufacturing by suppliers.

The platform can process video data, pictures, or other image data and associated metadata such as tags. The image data can be extracted from images by using a computer vision analysis to estimate factors related to body shape, size, color, style. The image data can be combined with other data to improve recommendations for a user. The platform can analyze the image data combined with user information (e.g., profile), device information, social media data, and/or other data to determine the suitability of products for particular consumers. The data is processed with machine learning (ML) algorithms to generate outputs that can help users make decisions about apparel that fits their size and shape, while shopping online, or find color cosmetics that complement their skin tone and face shape. The platform can cause a user device to present a filtered shortlist of products that aid in decision-making in fashion, apparel, or color cosmetics, in near real-time as the consumer shops, and including data insights for purchases and manufacturing decisions.

Multiple users register with the platform to post their pictures, which include the users wearing products (e.g., clothes, cosmetics). The users form a community that can vote or rate pictures of other users. The platform can extract and/or synthesize data related to the posted pictures along with crowdsourced data to formulate recommendations of suitable products for particular users. For example, the crowdsourced data can include feedback regarding whether products appear to have a good fit on a particular user. Likewise, the platform can predict trends that can guide decision making for manufacturing or distributing products in those industries.

The platform collects user inputs including datasets indicative of body shape, body size, and other factors at an end user device to build a user profile with parameters about physical characteristics that affect fit and appearance. The pictures are posted to receive crowdsourced feedback and are analyzed with ML algorithms to detect differences between the physical characteristics input by the user and those detected based on the pictures. Accordingly, the embodiments combine data input by the user with data of posted pictures including metadata, data extracted based on computer vision analysis, and other data including demographic data, which is processed by an algorithm-based analysis to build a profile and output recommendations based on a quantitative data analysis that discovers suitable products as well as data insights for purchases, consumer insights on fit, distribution locations, and aids in manufacturing decisions in near real-time.

The platform does not necessarily require users to input perceived data or self-descriptive data such as measurement data, which is often inaccurate because users take improper measurements or choose not to disclose their true measurements. Even though technologies could detect a user's size and shape by performing a full body scan, users are uncomfortable having body scans taken with a mobile device or in-store system because the user must pose in a bathing suit, underwear, or naked, for a device to accurately detect physical parameters. Further, these techniques generally only provide measurements that assist to identify a vanity size for a clothing brand.

The platform can process pictures and data in real-time or near real-time to predict suitable products for different body shapes and generate visual representations to show how the products could look on similarly shaped users. As such, the platform improves the likelihood that consumers will not return the products that they purchase. That is, the platform helps consumers quickly find a suitable product, which is essential for online retailers to reduce return rates, increase sale conversions, and lower overall costs. Hence, a consumer can avoid spending hours online searching for products, purchasing some products, and returning anything that does not fit. Therefore, the platform solves the problem of spending copious amounts of time guessing, frustrated, and in trial-and-error cycles to identify a product that fits and appears well. Similarly, identifying a successful trend for clothing or color cosmetics is challenging for companies and manufacturers that sell or make those products. As a result, the platform reduces the utilization of massive amounts of network resources consumed by shopping online and reduces the physical waste caused by returns.

FIG. 1 is a block diagram that illustrates a system 100 that can implement the disclosed platform. To use the platform, a user can operate a client device 104-1 or 104-2 (also referred to collectively as "client devices 104" and individually as "client device 104") to connect to the system 100 through the server system 102, post pictures of the user wearing certain products (e.g., apparel) and receive recommendations regarding the suitability of certain apparel for the user. A recommendation is formulated in part based on feedback from other users about the pictures posted of the user. The system 100 can discover products that fit their size and shape by looking at feeds provided through the system 100 for products that fit their shape. For businesses, the platform can offer real-time data about how certain products fit specific body sizes and shapes, demographic and picture trends, and data regarding clothing fit and popularity of items.

Examples of the client devices 104 include a smartphone or retail-installed camera-enabled computing device. The client devices 104 can receive or process user information such as account information and/or can include or be coupled to a camera device to capture picture images of user with products. The client devices 104 also include or are coupled to network interfaces 106 (e.g., transceivers), to communicate the user inputs and pictures to the server system 102 over a network 108. Other examples of the client devices 104 include tablet, laptop, or desktop computers, non-mobile personal computers, a smart mirror, and any other computing device that can obtain pictures and access the server system 102 over the network 108. Although only two client devices 104-1 and 104-2 are shown in FIG. 1, embodiments may include any number of client devices 104.

The server system 102 may include any number of server computers, desktop computers, or laptop computers that facilitate operations of the platform and access by the client devices 104 to exchange content such as pictures and recommendations. The server system 102 may administer a mobile software application ("app") or website that is accessible at the client devices 104. For example, the app can implement one or more of the processes described herein to capture pictures, capture user data or device data that can get associated with the picture. The app can include a user interface (UI) for users to exchange and view content (e.g., posted pictures). In some embodiments, the client devices 104 call an application programming interface (API) to perform functions of the platform.

The network 108 may include any combination of private, public, wired, or wireless portions. Any data communicated over the network 108 may be encrypted or unencrypted at various locations or along different portions of the network 108. Each component of the system 100 may include combinations of hardware and/or software to process data, perform functions, communicate over the network 108, and the like. For example, any component of the system 100 can include a processor, memory or storage, a network transceiver, a display, operating system and application software (e.g., for providing a UI), and the like. As illustrated, the system 100 is an example that is not intended to limit other suitable combinations of components and associated processes. Equivalent components may be substituted without changing the functions or operations of the system 100 and associated processes. Moreover, well known components are not illustrated or discussed herein for the sake of brevity.

From the server system 102, data provided by the client devices 104 is delivered to a digital distributed ledger subsystem 112 and/or a data storage subsystem 114. The digital distributed ledger subsystem 112 can store digital records as transactions that are distributed and maintained among nodes of a computer network, where the entries are stored in blocks of the ledger that are cryptographically related. The digital distributed ledger subsystem 112 can track the provenance authenticity of posts, votes, and product purchase transactions that take place on a company's online community. A public or private blockchain is a common example of a distributed ledger that can record data in an immutable, verifiable and permanent way. Specifically, a blockchain has a decentralized, distributed database where a ledger is maintained by peer nodes. Hence, an intermediary is not required to maintain a blockchain. The records are authenticated with cryptographic hashing and consensus mechanisms (also known as mining techniques).

The digital distributed ledger subsystem 112 is inherently resistant to modification of its recorded data. That is, once recorded, the data in a block cannot be altered retroactively. Through a peer network and distributed timestamping, the digital distributed ledger subsystem 112 is managed in an autonomous manner. Decentralized consensus can be achieved with the digital distributed ledger subsystem 112. This makes blockchains suitable for recording events, condition records, other records management activities, identity management, transaction processing, and proving data provenance.

The integration of the platform with a digital distributed ledger enables the platform to maintain trustworthy data such as the identity of users to prevent inflating fake individuals, companies, brands, or posts that would make the platform unreliable. That is, the digital distributed ledger secures personal information of users (e.g., individuals, companies) to enable authorized users to access trusted data. As such, for example, the search results (e.g., recommendations) generated by the platform are obtained through a trustworthy process where the origin and tracking of data is readily verified. Thus, the distributed ledger provides trust and control to users of the platform that seek feedback that is not manipulated.

The data analytics subsystem 118 can collect data from external sources 120 (e.g., demographic and other data), which is processed with quantitative analysis tools to output results to the data storage subsystem 114. The data analytics subsystem 118 can use the captured data to make recommendations on other products featured in pictures of other users that might be a good fit for a user. In particular, the data analytics subsystem 118 can process large aggregate data to perform an analysis that determines trend and fit data associated with the product in an online shopping platform, which is useful for retail companies and manufacturers to make decisions on future purchasing and manufacturing based on trending data.

The data storage subsystem 114 can deliver the user data to an ML subsystem 116, where the data is processed through one or more learning algorithms. The ML subsystem 116 uses statistical techniques to give the platform the ability to progressively improve performance of a task with more data (i.e., to "learn") without being explicitly programmed to perform the improvement. The ML subsystem 116's processes are based on pattern recognition and computational learning in artificial intelligence to construct algorithms that can learn from and make predictions on data. Such algorithms do not strictly follow static program instructions and can make data-driven predictions or decisions by building an ML model from sample inputs.

In general, ML is closely related to, and often overlaps with, computational statistics, which also focuses on prediction-making with computers. ML can also be unsupervised and be used to learn and establish baseline behavioral profiles for various entities and then used to find meaningful anomalies. ML tasks can be classified into two broad categories, depending on whether there is a learning signal or feedback available to a learning system. Examples include supervised learning, semi-supervised learning, active learning, reinforcement learning, and unsupervised learning. Another categorization of ML for executing tasks arises when one considers the desired output of a machine-learned system. Examples include classification, regression, density estimation, and dimensionality reduction. Approaches to ML include decision tree learning, association rule learning, artificial neural networks (e.g., deep learning), inductive logic programming, support vector machines, clustering, Bayesian networks, reinforcement learning, representation learning, similarity and metric learning, sparse dictionary learning, genetic algorithms, rule-based machine learning (e.g., learning classifier systems), etc.

Therefore, the ML subsystems 116 can devise analytical models and algorithms that lend themselves to predictive analytics. The analytical models can uncover insights through learning from historical relationships and trends in the data. As shown, the ML subsystems 116 can provide data to the data analytics subsystem 118, which can pull together the data from the digital distributed ledger subsystem 112, data storage subsystem 114, and/or the ML subsystem 116.

The data generated by the ML subsystem 116 and data storage subsystem 114 is delivered through the system 100 to the recommendation subsystem 110, which can curate the data to formulate one or more recommendations. The recommendations are communicated to the server system 102, through the network interfaces 106 to the client devices 104, over the network 108. A recommendation can include content such as suggestions of promoted products that help the user make decisions before buying products online, to improve the likelihood that the purchased product will be a good fit and appealing to the user. For example, a recommendation can indicate a proper fit of a fashion or apparel item or an optimal color for a cosmetic product. The recommendation can reflect datasets about a user (e.g., body shape, body size, demographics, location), feedback from other users (e.g., voting), social graph data, and other data that underwent a quantitative data analysis to discover suitable products. The platform can decide between recommendation choices to obtain consumer data insights for purchases and manufacturing decisions in apparel and color cosmetics. The data and quantitative analysis tools can also be used by the retailers and manufacturers to guide decisions regarding optimal locations to ship certain types of goods and indicate what types of goods to manufacturer or purchase based on the analysis generated by the disclosed techniques.

Figure 2:
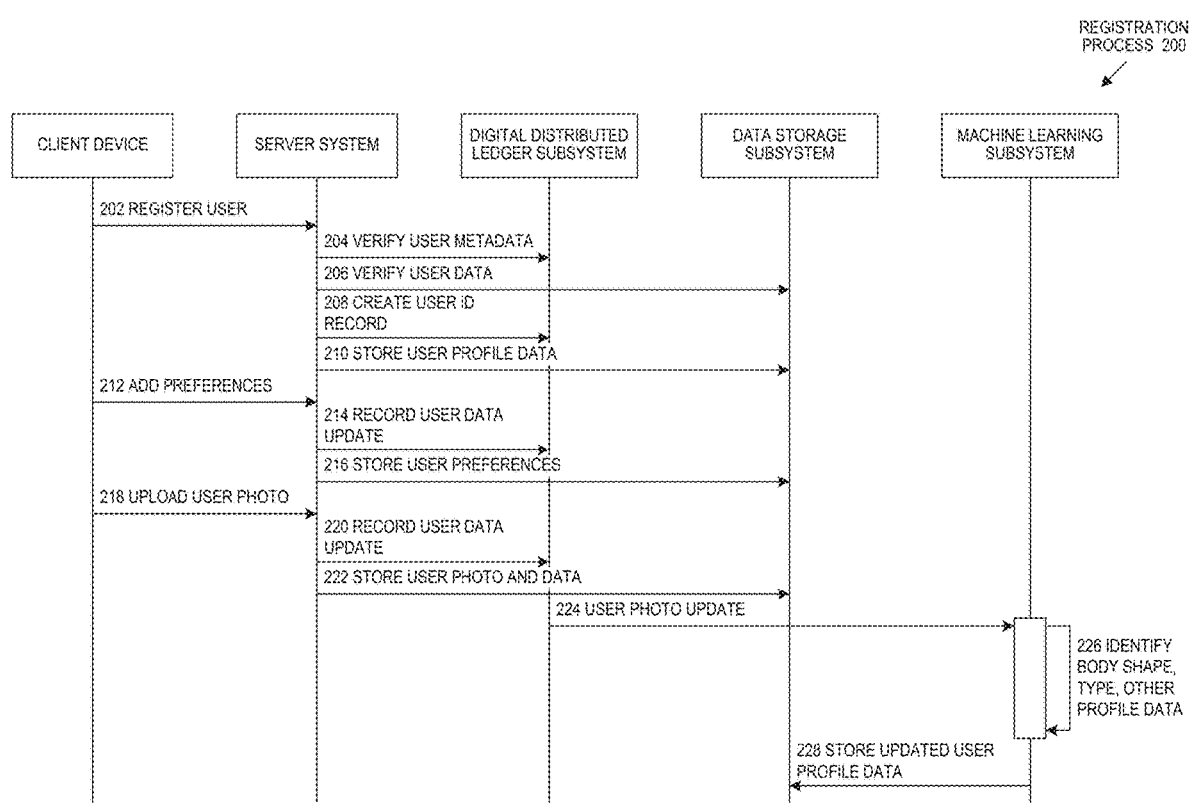
FIG. 2 is a flow diagram that illustrates a process for registering a user with the platform.

FIG. 2 is a flow diagram that illustrates a process 200 for registering a user with the platform. The user can access the platform through an app or website at the client device. At 202, the client device initiates a registration process by submitting a request to the server system. At 204, the server system can verify user metadata based on data stored at a digital distributed ledger subsystem. Examples of user metadata include information about the user device and/or a location of the user device.

The digital distributed ledger could be used to authenticate users and votes, as well as to allow users to control data. The initial user details and metadata can be stored on the digital distributed ledger at registration time. As the user interacts with the platform, additional details are stored at the digital distributed ledger, including a history of transactions. All or some of this data can be used to validate a user, possibly with different levels of "trustworthiness," based on how long the user has been active on the platform, how many transactions or interactions the user has recorded and the value of those interactions to the platform. In one example, users start interacting with the platform without registering and can register later, as a condition for accessing more advanced or valuable functionality. In these cases, the data stored at the digital distributed ledger from previous interactions can be used to validate user registration details. Likewise, the digital distributed ledger provides authenticated data for manufacturers, brands, retail partners, etc.

At 206, the server system can verify user data based on data stored at a data storage subsystem. For example, data input at the client device for the user profile can be stored at the data storage subsystem. Some or all of this information (or a unique hash or digital fingerprint of it) can be transferred to the digital distributed ledger subsystem for storage and subsequently used for validation.

Figure 4A:
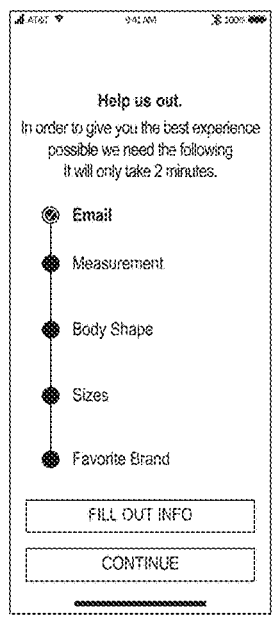
FIG. 4A depicts a screen view of a user interface (UI) configured to gather data for a user profile.
Figure 4B:
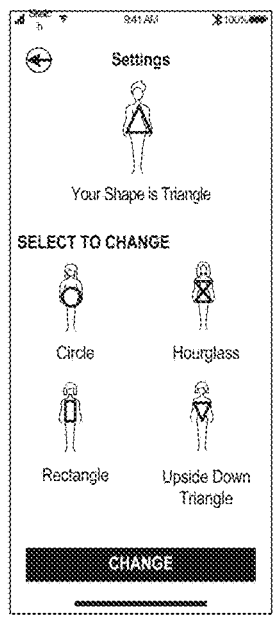
FIG. 4B depicts a screen view of the UI with selectable options to set a body shape for the user profile.
Figure 4C:
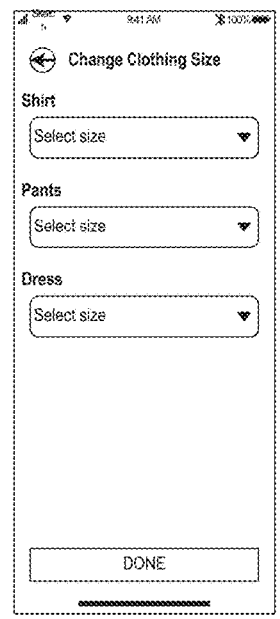
FIG. 4C depicts a screen view of the UI with dropdown menus for selecting sizes of the user for different apparel.

At 208, the server system creates a user ID and at least an indication of the user ID is stored at the digital distributed ledger subsystem. The server system associates the user ID with the user profile. At 210, the user profile data is stored at the data storage subsystem. At 212, the user can input preferences at the client device, which are communicated to the server system to build the user profile. For example, FIG. 4A depicts a screen view of a user interface (UI) configured to gather user data for the user profile. FIG. 4B depicts a screen view of the UI with selectable options to set a body shape for the user profile. Lastly, FIG. 4C depicts a screen view of the UI with dropdown menus for selecting sizes of the user for different apparel.

Referring back to FIG. 2, at 214, the server system stores at least an indication of the updated user preferences to the digital distributed ledger subsystem. At 216, the user preferences are stored with the user profile at the data storage subsystem. Examples of the user data include the unique user ID, gender, body size, body type, age, clothing or makeup preferences, social network, posting activity, voting activity, and purchasing activity. The stored user profile can be used to formulate and/or customize the recommendations.

At 218, the user of the client device can upload a picture image to the server system. At 220, the server system can record at least an indication of the updated user data including the picture to the digital distributed ledger subsystem. At 222, the picture and associated data is stored at the data storage subsystem. At 224, some or all data from the data storage subsystem is communicated to the ML subsystem and processed with one or more algorithms to identify features of the user including, for example, body type, profile data, location data and feedback/voting data. At 228, the ML subsystem sends output to store at the data storage subsystem. Thus, for example, the platform can be tailored for gender-centric purchase decision-making, as well as user generated, and social media/community generated data, in addition to using picture data, to produce feedback for users including individuals, online retailers, apparel companies, or the like.

Figure 3:
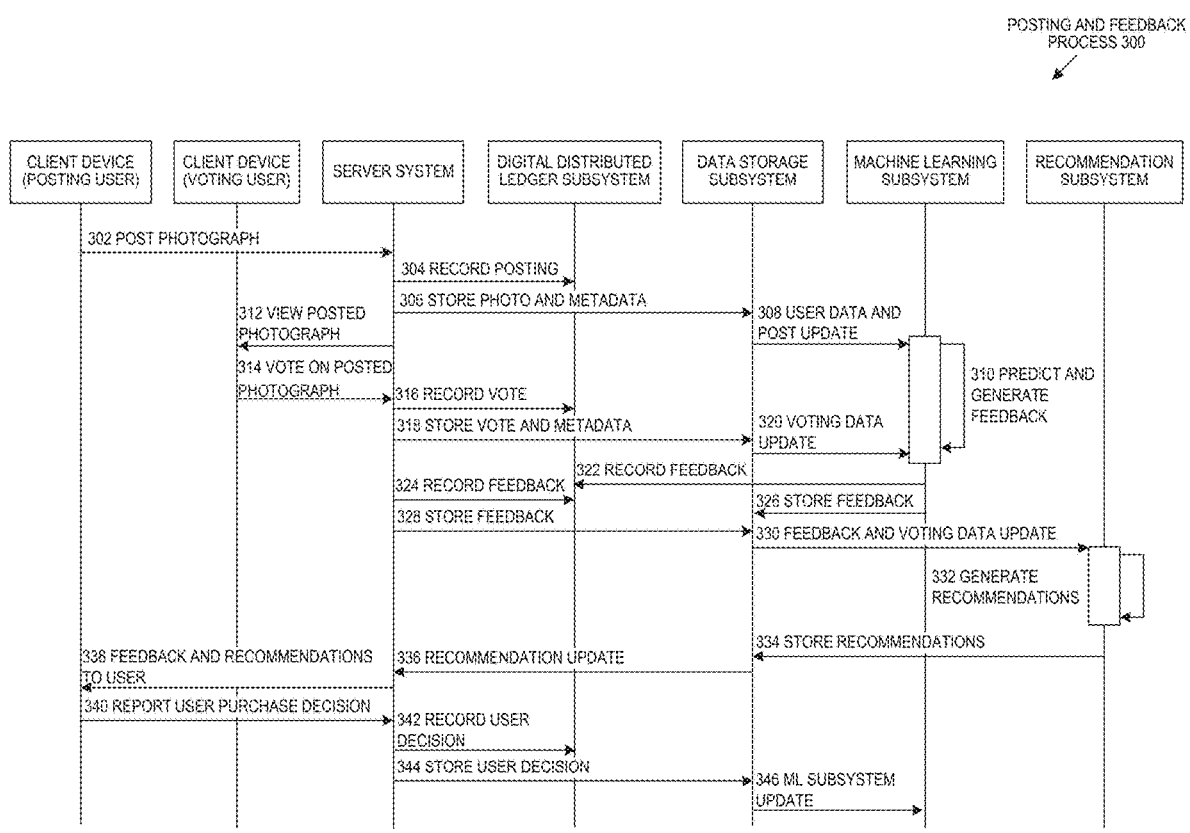
FIG. 3 is a flow diagram that illustrates a process for generating a recommendation for products based on a posted picture and feedback from other users.

FIG. 3 is a flow diagram that illustrates a process for generating a recommendation for merchandise based on a posted picture and feedback from other users on the platform. In particular, the platform enables a user to capture and share a picture of the user with a product which the user is wearing or using. The user can also cast votes for the pictures of other users. The process 300 includes steps for collecting user data to build a user profile, to post pictures, and to vote on pictures to discover insights into conscious and unconscious biases of users. The insights are used to formulate the recommendations for the users. In particular, the apps at the client devices can capture data, which is fed to a software application of the server system and processed by one or more ML algorithms to analyze image data, user data, and voting data, and formulate recommendations that compensate for any erroneous or missing data.

At 302, a picture is communicated from a client device to the server system and posted on the platform. The picture has content that includes the user and a fashion or beauty product being worn by the user. The picture can have associated metadata including, for example, the location where the picture was captured and a timestamp that indicates a point in time when the picture was captured. Other metadata can include a user ID and information indicative of the client device.

At 304, the server system can generate a unique fingerprint for the posted picture and associated metadata, which is saved at the digital distributed ledger subsystem. For example, the picture and associated metadata can be processed through a hashing function to produce a unique fingerprint that can be used to track the picture.

At 306, the picture and associated metadata are stored at the data storage subsystem for subsequent processing. In some embodiments, the metadata can include image recognition data extracted from the picture and/or geographic data that is associated with a GPS location obtained from the client device at the time when a picture was posted or where the picture was uploaded for voting as well as where a vote is registered. Specifically, the platform can also record the location of posts because to weigh the votes based on the location of their origin. For example, the votes in Northern California for a Northern California post is weighed more than votes from other regions such as Miami Florida Hence, the platform accounts for the location variance of fashion.

At 308, the data posted by the user and stored at the data storage subsystem is transferred to the ML subsystem. At 310, the ML subsystem processes the user data and image data to perform a predictive analysis that detects conscious and unconscious biases, which can be used to formulate recommendations.

The analysis performed at 310 can consider voting data. For example, at 312, a voting user uses a client device to vote on the picture that was posted by the posting user. In one example, a posted picture is voted on in real-time by a community of users. The feedback (e.g., like v. dislike votes) regarding whether the user looks good with the product can be weighted equally. In other words, each vote can be worth one vote in real-time feedback. In some embodiments, however, the feedback may not be weighted one-to-one. That is, each vote can be weighted differently. For example, a vote from a company, influencer, or a fashion adviser can be weighted as 20 votes, while others are weighted only as one or more votes based on the similarities in profile, voting habits, unconscious bias, location, and algorithmic processes. As such, a recommendation can be personalized to both conscious biases, including brands, colors, sizes, styles preferred by the user through proactive action in the platform such as through posting, survey feedback, purchase, following of other users' photographs and profiles, and coupled with unconscious biases including data that is not proactively shared about a user's own usage, from votes on pictures of other users, extracted data from those pictures, similar unconscious bias votes, etc.

Figure 5A:
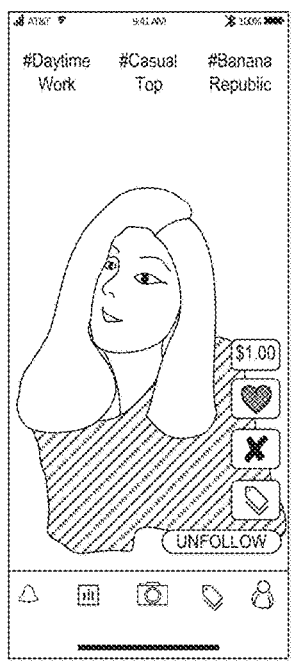
FIG. 5A depicts a screen view of the UI including a picture that can be voted on by users of the platform.

For example, FIG. 5A depicts a screen view of a UI including a posted picture that can be voted on by users of the platform. A voting user uses a client device to view a picture and associated data on the platform that the user is authorized to provide feedback (e.g., vote). In the illustrated example, the screen view includes a heart icon that can be selected to indicate a favorable vote or an "X" that can be selected to indicate an unfavorable vote. The screen view also includes a link to take a viewing user to a source where the displayed product can be purchased. In some embodiments, the platform pays a user to submit votes. For example, the illustrated screen view shows $1.00, which indicates the user's balance for voting.

Figure 5B:
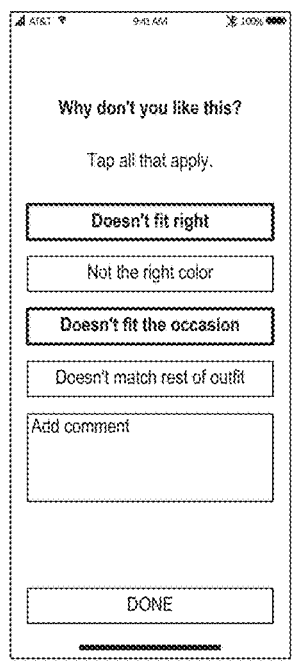
FIG. 5B depicts a screen view of the UI to request contextual information of a vote.
Figure 5C:
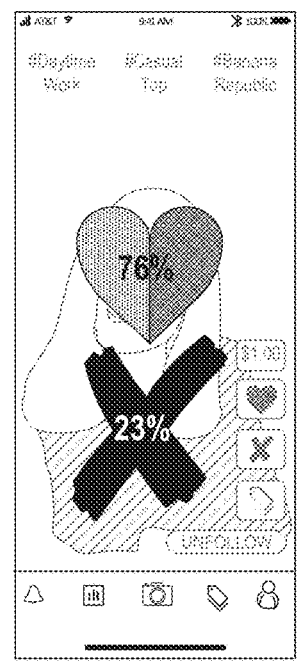
FIG. 5C depicts a screen view of the UI showing the results of voting on the picture by the users of the platform.

FIG. 5B depicts a screen view of the UI to request contextual information for the submitted vote. As shown, the screen view includes selectable comments that characterize the basis for voting favorably or unfavorably. The illustrated screen view also includes a text box to submit a custom reason for voting unfavorably. Once the contextual information is submitted, the voting user can view voting statistics. For example, FIG. 5C depicts a screen view of the UI showing the results of voting on the picture by users of the platform. As shown, 76 percent of users voted favorably, and 23 percent voted unfavorably.

Referring back to FIG. 3, at 314, the vote and related metadata is sent to the server system. Examples of the voting metadata can include the contextual information, a unique user ID, timestamp, location information, and device information. At 316, at least an indication of the vote is stored at the digital distributed ledger subsystem for subsequent validation and recording. At 318, a copy of the feedback and associated metadata is moved to the data storage subsystem where the feedback data is updated and stored.

At 320, the vote and metadata are then moved to the ML subsystem where the data is processed through algorithms along with the posted picture. The ML subsystem can identify the metadata, content of the picture (e.g., the user and product), and other data that is processed to generate feedback about the picture for the posting user and the voting user. The feedback can include product feedback used to formulate a recommendation. As described earlier, the ML subsystem uses artificial intelligence to detect a body type and product data (e.g., generic or brand name, SKU/ID) in the picture. The product feedback can be filtered based on product metadata such as a unique product ID, match by body type, match by demographic group, match by geography, and match by occasion, brand, etc. In some embodiments, the ML subsystem integrates other data to determine recommendations. The other data augments the ML to provide a list of recommendations. For example, when a recommendation is made, the user can provide like/dislike feedback about the recommendation, which creates another data point for the ML to learn about the user.

Figure 6A:
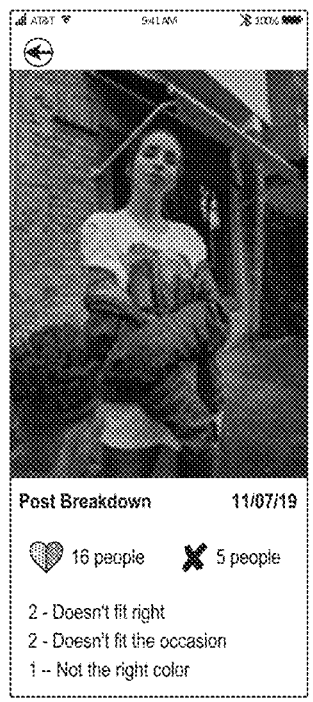
FIG. 6A depicts a screen view of the UI which summarizes voting data of a particular picture of a particular user.
Figure 6B:
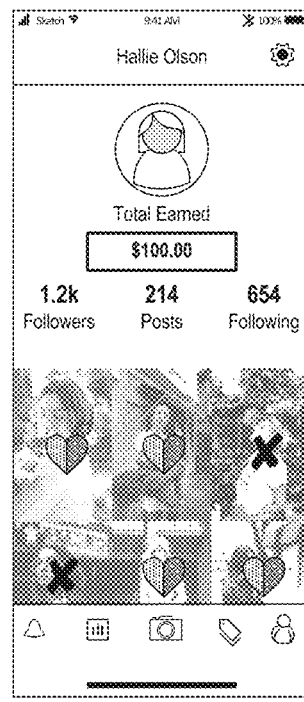
FIG. 6B depicts a screen view of the UI, which summarizes aggregate voting data for multiple pictures of the same user.

At 322, at least an indication of the users' feedback is stored to the digital distributed ledger subsystem. At 324, the feedback of the ML system is stored at the digital distributed ledger subsystem. At 326, the feedback from the ML system is stored at the data storage subsystem. At 328, the users' feedback is stored at the data storage subsystem. At 330, the users' and ML feedback, stored at the data storage subsystem, is used as input to the recommendation subsystem. In 332, the recommendation subsystem generates a recommendation based on the users' and ML feedback. At 334, the recommendation is stored at the data storage subsystem. At 336, the recommendation is obtained by the server system from the data storage subsystem. At 338, the client device of the posting user receives the feedback and recommendations. For example, FIG. 6A depicts a screen view of the UI which summarizes voting data of a particular picture of a particular user. FIG. 6B depicts a screen view of the UI which summarizes aggregate voting data for multiple pictures of the same user.

Referring back to FIG. 3, at 340, a report of the user purchase decision is communicated to the server system. An example of the purchase decision is like/dislike feedback that is captured and reported to the server system. At 342, at least an indication of the user decision is stored at the digital distributed ledger subsystem. At 344, the user decision is stored at the data storage subsystem. At 346, the ML system is updated with the purchase information.

The platform can generate recommendations that are based on a measure of unconscious bias and/or conscious bias. For example, a measure of unconscious bias can be detected from a user's votes on other user's content. In particular, a voting algorithm may enable a user to label a picture image as favorable or unfavorable and select one of multiple predefined reasons for the unfavorable vote. A regular or consistent voting pattern relative to the same or similar content in pictures can indicate a preferable for or against a particular characteristic or object. For example, a user may consistently vote "wrong" color when indicating to other users that they should "toss" apparel in their posted pictures. When making recommendations, the platform can scan the user's votes, look for those types of votes and seek out similarities in the user's votes, if any. The platform can infer, for example, that the user dislikes green despite the user never indicating such a preference in a personal profile or picture posted by the user.

Accordingly, an unconscious bias component of the platform utilizes a user's feedback associated with the posts of other community users. In particular, data of posted pictures can include data generated by processing the pictures through a computer vision algorithm, metadata tags or items shared in association with the posted pictures, coupled with how much to weight the posts based on similarities between user profiles, brand interests, types of clothing posted, location information, voting similarities associated with other photos, and the like, to formulate recommendations.

In one example, an output of the platform can include a recommendation of a particular product for a particular customer. The recommendation can be generated based in part on feedback from other users of a platform that post and/or review picture images or videos of content including individuals wearing products. The feedback can include votes that are binary (e.g., "good" or "bad") and/or a scale to rate content of the picture images (e.g., 1 through 5). The votes can be tallied and processed to determine whether certain articles of clothing is suitable for particular consumers. In one example, the recommendation is for similar, complementary, or related clothing if a tally of crowd-sourced votes indicate a favorable opinion about a consumer wearing certain clothes. Likewise, a recommendation can exclude certain clothing if the tally of crowdsourced votes indicates an unfavorable opinion.

Figure 7A:
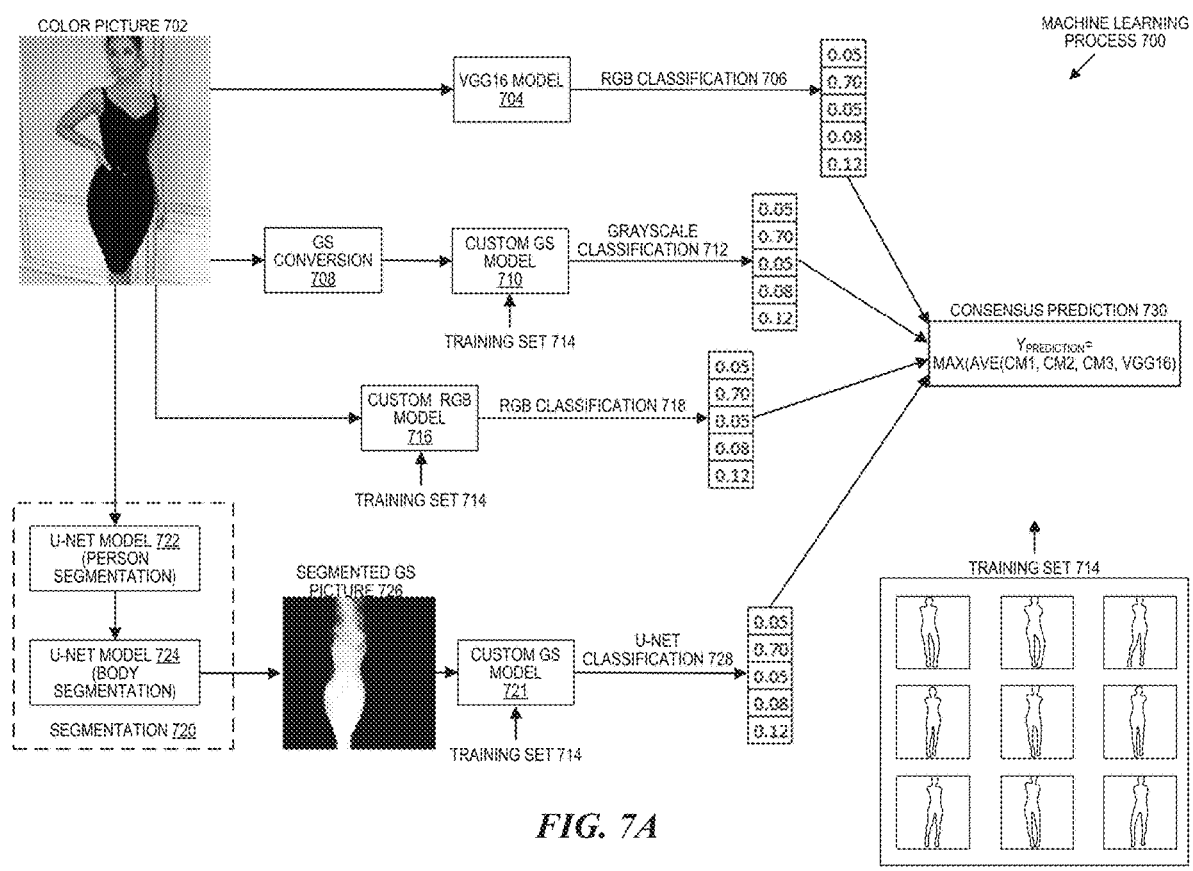
FIG. 7A is a block diagram that illustrates a machine learning (ML) process for identifying a body shape of a person in a color picture.

FIG. 7A is a block diagram that illustrates an ML process 700 to predict a body shape of a person in a color picture 702. As shown, the picture 702 includes a woman (the person) wearing a black dress. In this example, the woman is the user of the platform. The user posts the picture 702 on the platform for other users to vote whether they like or dislike the content in the picture 702. The picture 702 is processed through multiple branches of the ML processes 700 to determine independent classifications for a body shape of the user. The picture 702 can be processed in parallel or serially through one or more models of the multiple branches to independently classify the user's body shape. The outputs of the models are classifications that can be normalized or combined to yield an overall prediction of the user's body shape. In the illustrated example, the body shape types include "Apple," "Hourglass," "Inverted Triangle," "Rectangle," and "Triangle." As shown, the models are custom models and/or standard convolution neural network (CNN) models such as a VGG16 model.

In one branch of the ML process 700, the picture 702 is processed in color through a VGG16 model 704 to produce a red, green, blue (RGB) classification 706, which includes a 1×5 array of values that each correspond to a likelihood of a particular body shape. As shown, there is a 0.05 probability that the user has an Apple body shape, a 0.70 probability that the user has an Hourglass body shape, a 0.05 probability that the user has an Inverted Triangle body shape, a 0.08 probability that the user has a Rectangle body shape, and a 0.12 probability that the user has a Triangle body shape. Thus, the output of the VGG16 model 704 classifies produces an RGB classification 706 that indicates the user has an Hourglass body shape.

Figure 7B:
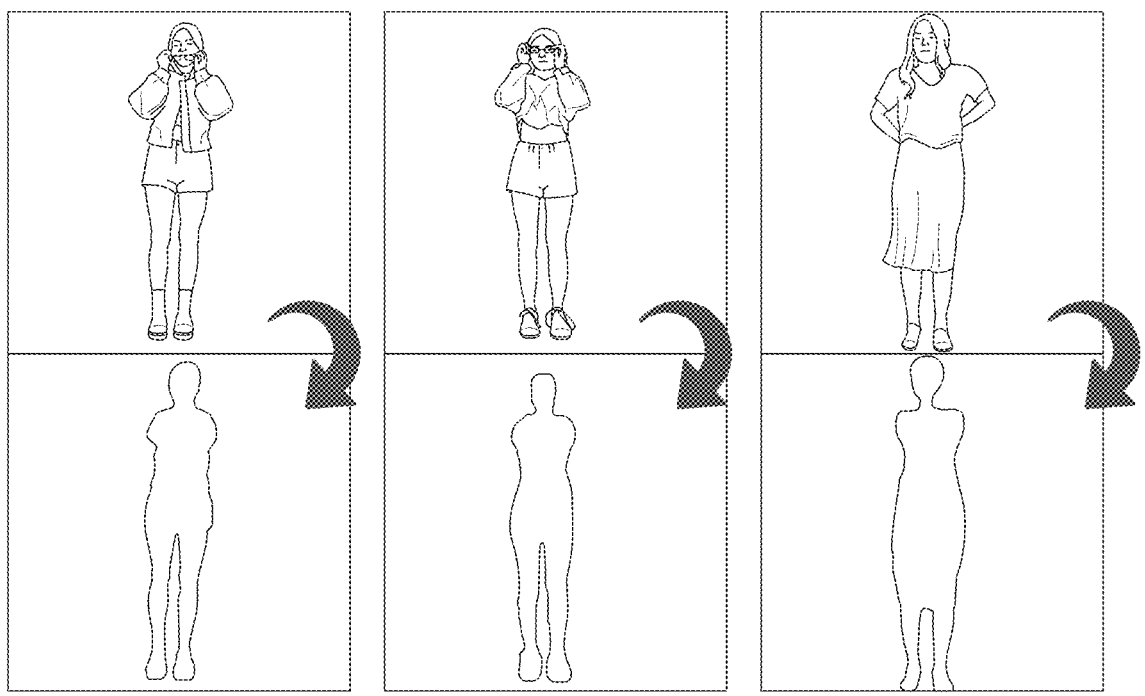
FIG. 7B depicts extractions of body shape outlines of persons from pictures.
Figure 7C:
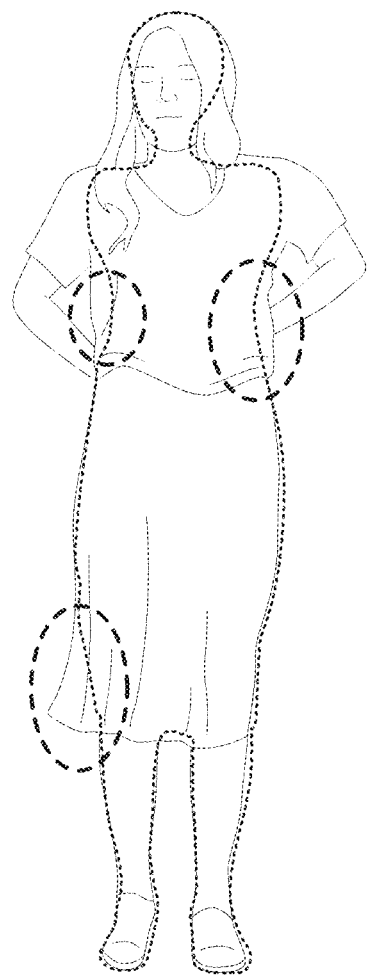
FIG. 7C depicts areas of a body shape outline that are distorted by clothing worn by a person.

In another branch of the ML process 700, the picture 702 undergoes a grayscale (GS) conversion 708 and is processed through a custom GS model 710 to produce a GS classification 712, which includes another 1×5 array of values for the body shapes. As shown, the output of the custom GS model 710 similarly classifies the user as having an Hourglass body shape. The custom GS model 710 is customized with a training set 714 of labeled body shapes. For example, FIG. 7B depicts outlines of body shapes extracted from pictures of the user and/or other users. The labeled body shapes are generated even though the persons in the pictures are fully clothed because a body shape outline is processed to adjust areas that distort the body shape outline. For example, FIG. 7C depicts areas of a body shape outline that are distorted by clothing worn by a person. The areas are circled with dash lines. The body shape outline of FIG. 7C is adjusted manually or algorithmically to account for the distortions. Likewise, the body shape outlines of FIG. 7B can be labeled manually or algorithmically for particular body shapes. Thus, the labeled body shapes form the training set 714 for custom models. In some implementations, once the body shape of the user in picture 702 has been predicted, a labeled body shape image of the picture 702 can be used to update the training set 714.

In another branch of the ML process 700, the picture 702 is processed in color through another custom model. However, the custom model of this branch is a custom RGB model 716 that produces an RGB classification 718, which includes another 1×5 array of values for the body shapes. As shown, the output of the custom RGB model 716 similarly classifies the user as having an Hourglass body shape. The custom RGB model 716 is customized with a training set 714 or another training set of labeled body shapes.

In yet another branch of the ML process 700, the picture 702 is pre-processed by undergoing segmentation 720 to extract the user's image relative to the rest of the picture 702. Specifically, the picture 702 is processed in color through a U-Net model 722 to segment the user image from the picture 702. The picture 702 with the segmented user is then processed through another U-Net model 724 that segments the user's body image. The output of the segmentation 720 is a segmented grayscale (i.e., monochromatic) picture 726. In general, a U-Net model implements a CNN that is based on the fully convolutional network with an architecture that is modified and extended to work with fewer training images and to yield more precise segmentations. The custom grayscale model 721 processes the segmented grayscale picture 726 to produce the U-NET classification 728, which includes another 1×5 array of values indicating that the user has an Hourglass body shape. The custom GS model 720 is customized with a training set 714 or another training set of labeled body shapes.

In one example, a consensus prediction 730 is calculated as the maximum of average values for the classifications 706, 712, 718, and/or 728. That is, the maximum is the user's overall predicted body shape. In other examples, the consensus prediction is a maximum or minimum of output classifications, depending on the form of the output. Although only four branches of the ML process 700 are shown in FIG. 7A, other embodiments can include combinations including fewer or more branches that are not shown herein for the sake of brevity. For example, a branch of the ML process 700 can include a Kernel methods-based third classifier.

Figure 7D:
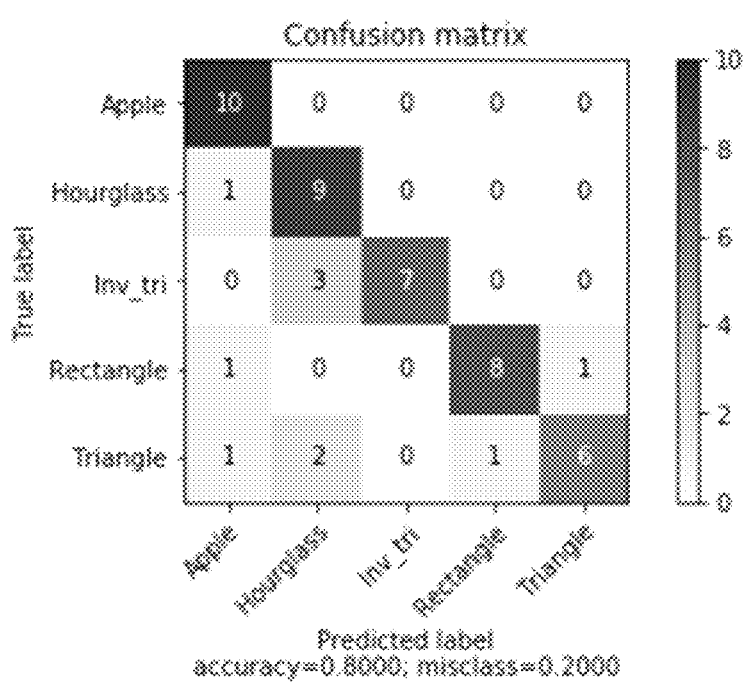
FIG. 7D depicts a confusion matrix that shows the accuracy of classifications.

FIG. 7D depicts a confusion matrix that shows the accuracy of classifications of ten images per category. The results reflect the combined classifications of the multiple branches of the ML process 700. As shown, 10/10 pictures of persons with Apple body shapes were detected, 9/10 pictures of persons with Hourglass body shapes were detected, 7/10 pictures of persons with Inverted Triangle body shapes were detected, 8/10 pictures of persons with Rectangular body shapes were correctly detected, and 6/10 pictures of persons with Triangle body shapes were detected.

The predicted body shape of a user (e.g., $Y_{prediction}$) can be used to suggest clothing that is suitable for a user. For example, if the user initially inputs an Hourglass body shape but the platform predicted that the user actually has an Apple body shape, the predicted body shape is used to identify clothes that properly fit the user.

Figure 8:
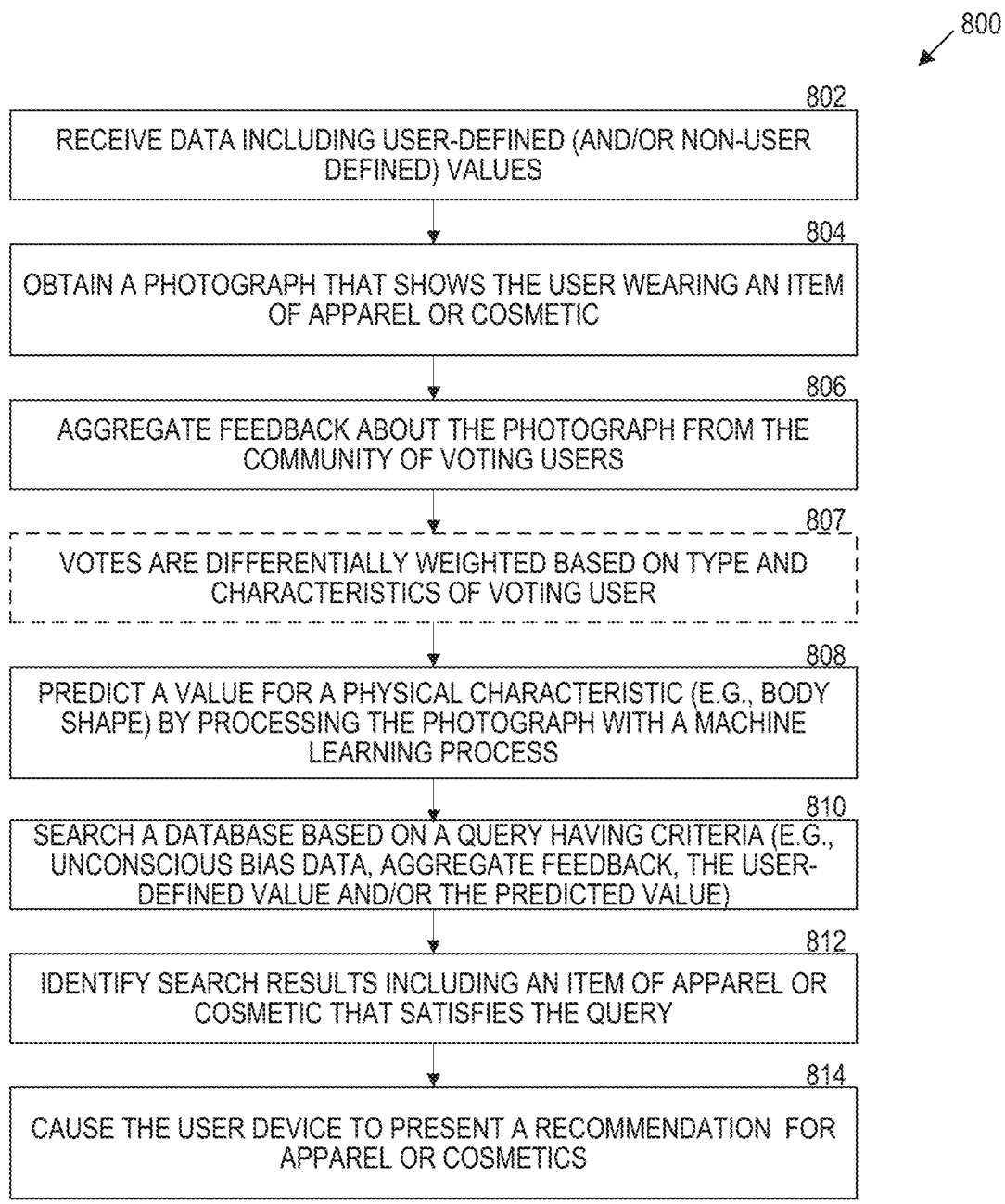
FIG. 8 is a flowchart that illustrates a method performed by a system of the platform to aid a user in decision-making when shopping for apparel or cosmetics.

For example, FIG. 8 is a flowchart that illustrates a method performed by a system of the platform to aid a user in decision-making when shopping for apparel or cosmetics. At 802, the system receives data including user-defined values input by the user (e.g., posting user) to a user device (e.g., smartphone). The user can input multiple user values for multiple physical characteristics and user preferences for apparel or cosmetics. The physical characteristics can include, for example, a body size and body shape. The multiple user preferences can include, for example, a preferred color and brand of apparel. The system can also receive values that are not defined by a user but are included in the user profile. For example, examples of data that can populate the user profile include location information or other information obtained by a smartphone's GPS capability or other sources of the system. The user creates profile and provides user data related to shape, size, color interest and other preference data. This data may be gathered not at the time of creation of user profile but throughout the period of usage by the consumer. The profile and user data may be tracked via the company's server or distributed and/or block chained ledger.

In some implementations, the values for the user profile are derived based on user inputs. For example, the user can input a body size value for each of multiple items of apparel of particular brands. The body size is input on A user interface of the user device as a perceived body size. The system can estimate the user's body size by cross-referencing each body size value at a table that maps body sizes for particular types of clothing items of particular brands. The estimated body size can be stored in a user profile as a physical characteristic.

At 804, the system obtains a photograph that shows the user wearing an item of apparel or cosmetic. The photograph is posted online for viewing by a community of voting users. For example, the user can use the app on a smartphone to capture a selfie photograph wearing clothes to get help deciding whether to keep or not keep the item. The system can cause the user device to prompt the user for input that indicates a type and a brand of the item of apparel worn by the user in the photograph. Thus, the user is asked to associate the photograph with a type of item, brand and other information. As such, the photograph is tagged with metadata that can be used to learn about the user.

Figure 9A:
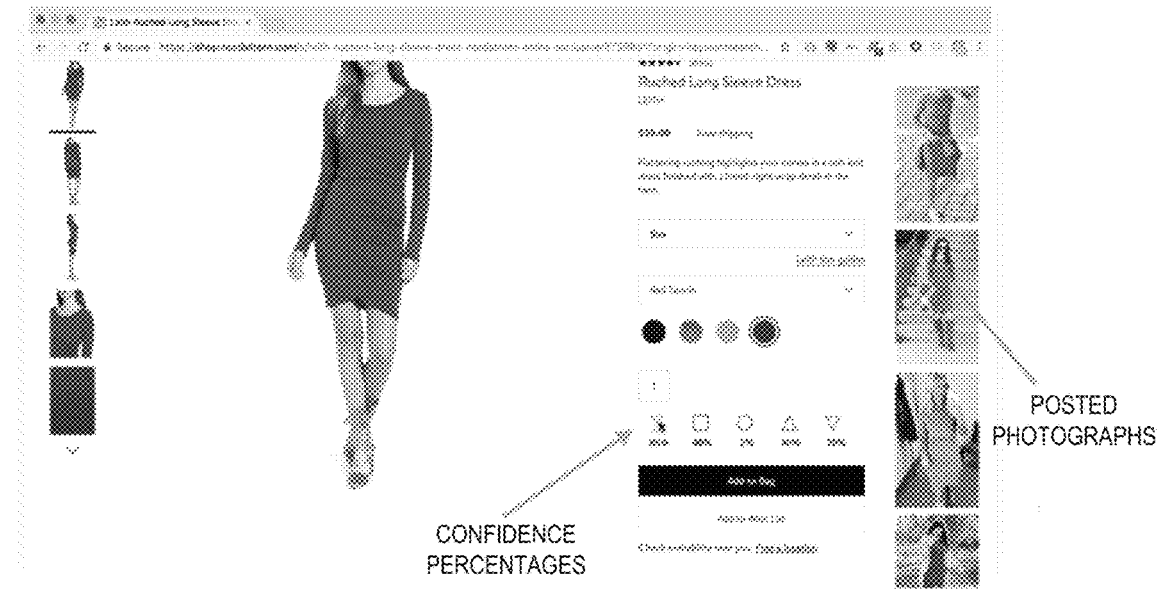
FIG. 9A is a screenshot of a webpage that integrates aggregate feedback data including a confidence rating.
Figure 9B:
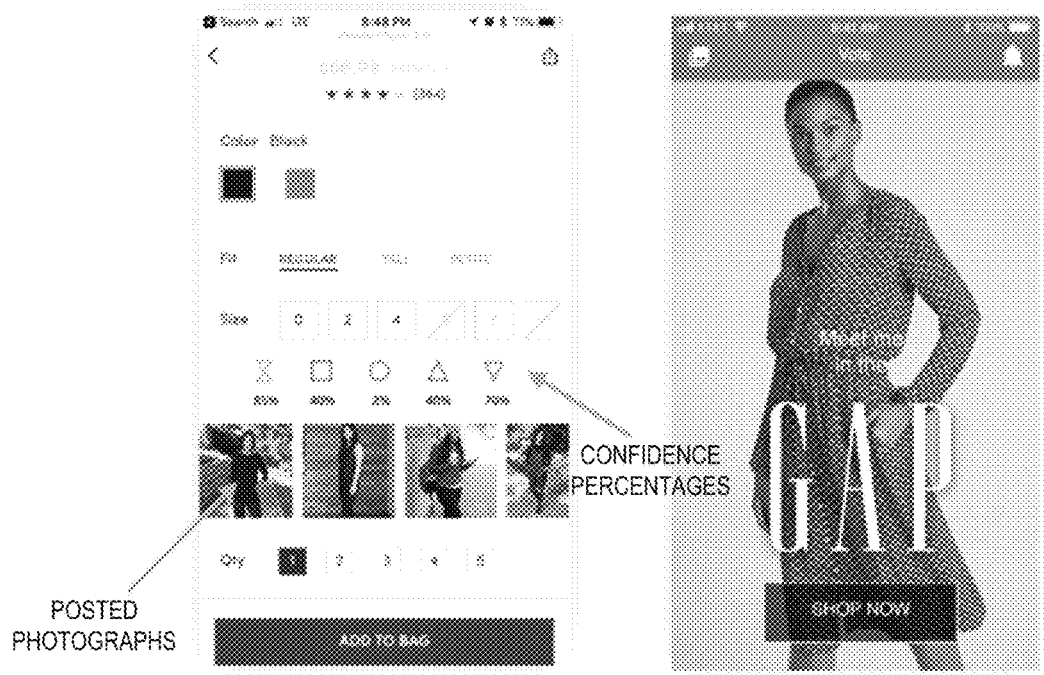
FIG. 9B includes screenshots of a mobile app that integrates aggregate feedback data including a confidence rating.

An API can be accessed by authorized entities (e.g., businesses) to obtain aggregate feedback data that is associated with items featured in photographs. A business can post authorized photographs on their websites and mobile applications to help users with decision making. For example, FIG. 9A is a screenshot of a webpage that integrates aggregate feedback data including a confidence rating. FIG. 9B includes screenshots of a mobile app that also integrates aggregate feedback data including a confidence rating. The confidence ratings can help users make confident decisions about buying apparel that is suitable for their body shapes. As such, the scores help consumers purchase more items, with less frequent returns because of an increased confidence in a purchase.

As shown in FIGS. 9A and 9B, the confidence ratings are number percentages of women with particular body shapes who have successfully fit a piece of clothing shown in the pictures. For example, the number percentages can indicate that women with an Hourglass body shape have an 85% percentage of successfully fitting the dress shown in the picture compared to women with 40% of women with a Square body shape. The data can be pulled from the binary voting data that is tied to that brand and product. Hence, the platform can provide data that is accessible via an API that feeds photographs of users who have tried on a brand outfit, sorts that information by body shape, and provides success fit percentages.

At 806, the system aggregates feedback about the photograph from the community of voting users. The voting users can preview the photograph and post to the community and to social media sites, as well as to family and friends. A user can vote in the community, or by way of social media, text message (SMS), or email, on other user's photographs. The online community, as well as social media and family or friends, are able to provide feedback in near real time on whether the user should keep or not keep the item that is being worn in the photograph. In some embodiments, an apparel or cosmetic company's ML powered system can also vote and provide feedback. The feedback can include a vote from each voting user that indicates a favorability value for the user wearing the item of apparel or cosmetic as shown in the photograph. In one example, the favorability value is binary, indicating that the photograph is either favored or disfavored by a voting user. The aggregated feedback can include contextual statements submitted by a voting user, where each contextual statement indicates the basis for the binary value. In one example, a contextual statement is input by a voting user as text. The system can perform a natural language analysis of the textual input to generate a criterion for the query used to search for apparel items or cosmetics to recommend to the user. In some embodiments, each authorized voting user is incentivized monetarily to provide feedback for the photographs.

In some implementations, the user can see in near real-time the voting for a posted photograph. The initial feedback can be in Yes/No with the ability to get deeper data (e.g., real number of votes, why the vote may be "No" or "Yes", how the votes are broken out on "No" for example "Not the right color", "Not the right occasion"). The back-end data for recommendations that the user may see selectively from the voting in real time from the photograph post are the free form feedback (user feedback generated that is written by a user versus clicking on pre-formulated responses).

The feedback can be processed by the algorithm using natural language processing methods to further determine why an item is not a good fit. For example, the free form data feedback from a user might further provide details on fit such as "The dress was too snug on your hips, making your butt look very big." This free form data is not necessarily shared in its totality directly in this form with the user but may be provided to the consumer in snippets that include pulled out works such as "snug on hip" in the service. This data is also provided to supply the algorithm more data to on sizing, style, validation and more for the recommendation. The free form data that the user provides to other users can be used as unconscious data to feed recommendation for the user.

At 807, the system the votes of users are "weighted" after the aggregation of the voting user data. For example, each vote can be weighted equally (e.g., each vote is worth one vote). In some implementations, however, the votes are not weighted one-to-one (e.g., votes are weighted differently). For example, a vote from a company, influencer, or a fashion adviser can be weighted more than regular users. In one implementation, votes are weighted based on similarities in profile, voting habits, unconscious bias, location, and algorithmic processes.

At 808, the system predicts a value for the physical characteristic (e.g., body shape) by processing the photograph with a ML process. The predicted value is generated independent of the user-defined value stored in the user profile. For example, the platform can process the photograph through a multi-branched ML process (see, e.g., FIG. 7A). In one branch, a color version of the photograph is processed with an ML model to output a first classification indicative of a likelihood that the physical characteristic of the user has one of a plurality of possible values. In another branch, a grayscale representation of the color photograph is processed with a second ML model to output a second classification indicative of a likelihood that the physical characteristic of the user has one of a plurality of possible values. The multi-branched ML process can include any number of branches. For example, in one implementation, a third branch can include another ML model to process the color photograph and output a classification.

Each classification can include multiple values for the physical characteristic of the user. The predicted value can be generated based on a combination of the classifications output by the ML models. For example, the predicted value for the physical characteristic is obtained by determining a minimum, maximum, or average value of the multiple values for the physical characteristic, for each classification. A maximum value among each minimum, maximum, or average classification is the predicted value of the physical characteristic.

The grayscale representation of the color photograph can be produced according to the process shown in FIG. 7A. For example, the color photograph can be processed with a first U-Net model that segments a portion including the user from a remaining portion of the color photograph. The segmented photograph can be further processed with a second U-Net model that segments a portion including a body portion of the user from a remaining portion of the user in the segmented photograph to produce a grayscale image with a segmented body of the user.

A branch of the ML process can be trained based on a training set of photographs that each show the user wearing an item of apparel. For example, each training photograph can be generated according to an extraction process where an outline of the user's body shape is extracted from a training photograph (see, e.g., FIG. 7B). The outline can be adjusted to compensate for an item being worn by the user that distorts the user's body shape (see, e.g., FIG. 7C).

In one example, the system replaces the user-input value for the body shape stored in the user profile with the predicted value for the body shape. As such, subsequent searches reflect the accurate body shape for the user.

At 810, the system searches a database based on a query having criteria that includes an indication of the aggregate feedback and at least one of the user-defined value or the predicted value. In some embodiments, the system adds unconscious bias data as criteria of the query. As explained earlier, the unconscious bias data is obtained based on the user's votes on other users' posts, which are analyzed to identify any potential bias towards or against factors such as clothing brands, colors, etc.

The query is applied to a database, which can include multiple items of apparel or cosmetics that are each labeled with a value for the physical characteristic. The query can be formulated to compensate for a misperception by the user, which is determined based on a difference between a user-input value and the aggregate feedback.

At 812, the system can identify search results including an item of apparel or cosmetic that satisfies the query. For example, search results that satisfy the query can satisfy a threshold amount of the query's criteria such as over 50.1% of the criteria. The threshold can be set by the system or manually to define what constitutes a search result. The platform can dynamically identify additional recommendations for items of apparel or cosmetics as the user continues navigating online to search for apparel or cosmetics.

At 814, the system can cause the user device to present a recommendation or prompt for apparel or cosmetics based on the search results. The recommendation or prompt includes the item of apparel or cosmetic that satisfies the query. For example, the user device can present a recommendation to keep or purchase the item of apparel worn by the user in the photograph at the location where the photograph was captured and posted by using a smartphone while the user is shopping at a store. In another example, the user device can present recommendations or prompts of items as the user searches for apparel or cosmetics. (e.g., online or in-person).

The user can see recommendations via mobile device notifications, in-store system feedback, social and/or email or other communication methods for other items that might fit through recommendations calculated using our algorithms on the photo, user, social, device, demographic and other data available to determine fit. The user can, at that time, determine if the user thinks it's a keep or not keep and also can save the photograph as reference for purchase. The photograph may include links to purchase. In some embodiments, the photos, posts and recommendations will include links or mechanism to purchase items through the company's platform.

Although the description focuses on examples in the fashion and beauty industries, implementations of the platform encompass other business segments. For example, the platform can be implemented for automotive products, home goods, etc. The data can be aggregated by API and anonymized for any accessing outside of the app community. Moreover, implementations can include other features such as anonymizing photographs, user information, device information, demographic, social voting data to protect a user's privacy. Aggregate proprietary analysis and data on sizing analysis can be provided on ecommerce website. In some examples, an e-commerce company can look at proprietary aggregate data and analysis associated with item featured in photographs to make decisions about wholesale purchases and manufacturing.

The disclosed platform can include software components or modules that can perform the illustrated processes. The software components can include software code of client devices, server/cloud network application services, and computer software algorithms for data aggregation, association, and analysis. The steps of the processes can be performed sequentially or non-sequentially. In some embodiments, the software components use if-then conditional statements as well as probabilities based on statistical information from historical data and subroutines of computer programming to associate user data to pictures, associate social data to pictures, run analysis on voting patterns by the user tied to shapes, colors, and demographic information pulled from profiles and/or a user device or in-store system that was authorized by the user, run analysis on data gathered through photograph recognition ML tied to the photos, and to help make analysis on all of the data to recognize patterns and associations therein.

In some embodiments, the platform is a software service with business-to-business features that can be accessed by businesses that license the software services and proprietary data. As such, the software service can capture and generate data that is used in processes for data aggregation and data analysis using the algorithms disclosed herein.

Figure 10:
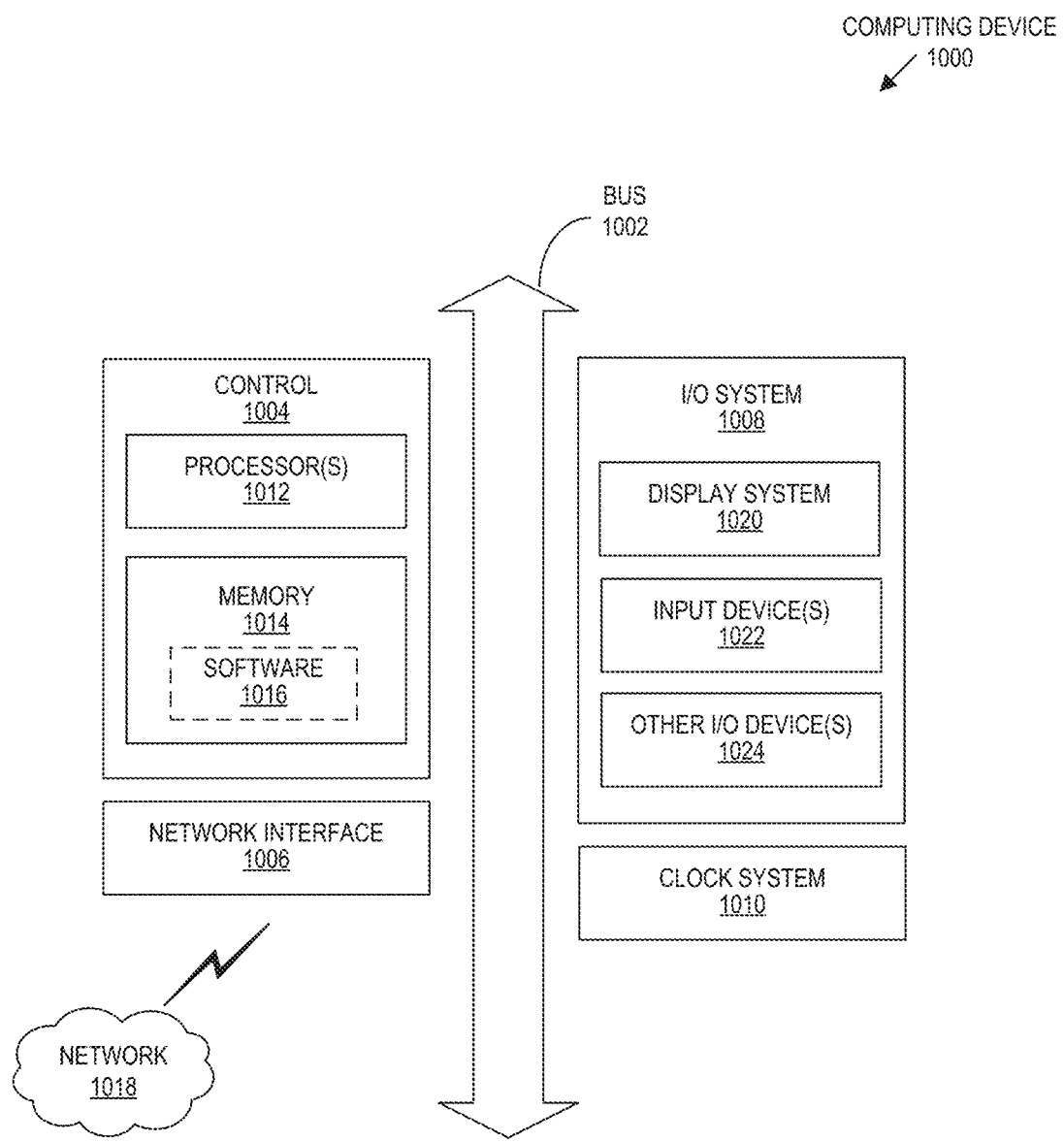
FIG. 10 is a block diagram of a computing device operable to implement at least some aspects of the disclosed technology.

FIG. 10 is a block diagram of a computing device 1000 of system 100 operable to implement the disclosed technology. The computing device 1000 may be a generic computer or specifically designed to carry out features of the system 100. For example, the computing device 1000 may be a system-on-chip (SOC), a single-board computer (SBC) system, a desktop or laptop computer, a kiosk, a mainframe, a mesh of computer systems, a handheld mobile device, or combinations thereof.

The computing device 1000 may be a standalone device or part of a distributed system that spans multiple networks, locations, machines, or combinations thereof. In some embodiments, the computing device 1000 operates as a server computer or a client device in a client-server network environment, or as a peer machine in a peer-to-peer system. In some embodiments, the computing device 1000 may perform one or more steps of the disclosed embodiments in real time, in near real time, offline, by batch processing, or combinations thereof.

As shown, the computing device 1000 includes a bus 1002 operable to transfer data between hardware components. These components include a control 1004 (i.e., processing system), a network interface 1006, an Input/Output (I/O) system 1008, and a clock system 1010. The computing device 1000 may include other components not shown or further discussed for the sake of brevity. One having ordinary skill in the art will understand any hardware and software included but not shown in FIG. 10.

The control 1004 includes one or more processors 1012 (e.g., central processing units (CPUs), application specific integrated circuits (ASICs), and/or field programmable gate arrays (FPGAs)) and memory 1014 (which may include software 1016). The memory 1014 may include, for example, volatile memory such as random-access memory (RAM) and/or non-volatile memory such as read-only memory (ROM). The memory 1014 can be local, remote, or distributed.

A software program (e.g., software 1016), when referred to as "implemented in a computer-readable storage medium," includes computer-readable instructions stored in a memory (e.g., memory 1014). A processor (e.g., processor 1012) is "configured to execute a software program" when at least one value associated with the software program is stored in a register that is readable by the processor. In some embodiments, routines executed to implement the disclosed embodiments may be implemented as part of operating system (OS) software (e.g., MICROSOFT WINDOWS, LINUX) or a specific software application, component, program, object, module or sequence of instructions referred to as "computer programs."

As such, the computer programs typically comprise one or more instructions set at various times in various memory devices of a computer (e.g., computing device 1000) and which, when read and executed by at least one processor (e.g., processor 1012), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., the memory 1014).

The network interface 1006 may include a modem or other interfaces (not shown) for coupling the computing device 1000 to other computers over the network 1018. The I/O system 1008 may operate to control various I/O devices, including peripheral devices such as a display system 1020 (e.g., a monitor or touch-sensitive display) and one or more input devices 1022 (e.g., a keyboard and/or pointing device). Other I/O devices 1024 may include, for example, a disk drive, printer, scanner, or the like. Lastly, the clock system 1010 controls a timer for use by the disclosed embodiments.

Operation of a memory device (e.g., memory 1014), such as a change in state from a binary one to a binary zero (or vice versa) may comprise a visually perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electrical or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally regardless of the particular type of machine or computer-readable media used to actually effect the embodiments.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A non-transitory computer-readable medium including instructions for performing a predictive search to compensate for a misclassification that, when executed by at least one processor, causes a system to:
   receive a user-defined classification of a physical characteristic of the user, the user-defined classification being input to a user device;
   obtain an image captured by a camera device, the image being authorized for access by a plurality of authorized users;
   aggregate binary feedback data submitted by the plurality of authorized users, the aggregate binary feedback data indicating a favorability of the image by the plurality of authorized users;
   predict a classification for the physical characteristic by processing the image with a machine learning (ML) process, the predicted classification being generated independent of the user-defined classification;
   search a database based on a query having criteria that includes an indication of the aggregate binary feedback data and at least one of the user-defined classification or the predicted classification;
   identify a search result that satisfies the query, the search result being obtained from the database; and
   cause display, on a display device of the user device, a recommendation including at least an indication of the search result.

2. The computer-readable medium of claim 1, wherein the image is a color photograph that includes a user of the user device, and the system is caused to predict the classification for the physical characteristic by processing the color photograph through a multi-branched ML process that causes the system to:
   process the color photograph with a first ML model to output a first classification indicative of a likelihood that the physical characteristic of the user has one of a plurality of possible classifications; and
   process a grayscale representation of the color photograph with a second ML model to output a second classification indicative of a likelihood that the physical characteristic of the user has one of the plurality of possible classifications,
   wherein the predicted classification is generated based on a combination of the first classification and the second classification.

3. The computer-readable medium of claim 2, wherein processing the color photograph through the multi-branched ML process causes the system to:
   process the color photograph with a third ML model to output a third classification indicative of a likelihood that the physical characteristic of the user has one of a plurality of possible classifications,
   wherein the prediction of the physical characteristic is generated based on a combination of first, second, and third classifications.

4. The computer-readable medium of claim 2, wherein the grayscale representation of the color photograph is produced by causing the system to:
   process the color photograph with a first U-Net model that segments a portion including the user from a remaining portion of the color photograph; and
   process the segmented photograph with a second U-Net model that segments a portion including a body portion of the user from a remaining portion of the user in the segmented photograph.

5. The computer-readable medium of claim 2, wherein each of the first classification and the second classification includes a plurality of values for the physical characteristic of the user, and predicting the classification for the physical characteristic comprises causing the system to:
   for each of first classification and the second classification, determine an average value of the plurality of values for the physical characteristic; and
   determine a maximum value among each average value, the predicted classification of the physical characteristic being set to the maximum value.

6. The computer-readable medium of claim 1, wherein a criterion of the criteria includes an indication of binary feedback input by the user to the user device for a plurality of images posted by a plurality of users, and wherein the system is further caused to:
   determine a bias based on a difference between the binary feedback and a user-defined preference, wherein the criterion is indicative of the bias.

7. The computer-readable medium of claim 1, wherein the user-defined data and the aggregate binary feedback are stored at a blockchain to enable verifying provenance of data utilized for the criteria.

8. A computer-implemented method comprising:
   receiving a user-defined classification of a characteristic of a user, the user-defined classification being input to a user device;
   obtaining an image captured by a camera device, the image being authorized for access by a plurality of authorized users;
   aggregating binary feedback data submitted by the plurality of authorized users, the aggregate binary feedback data indicating a favorability of the image by the plurality of authorized users;

predicting a classification for the characteristic by processing the image with a machine learning (ML) process, the predicted classification being generated independent of the user-defined classification;

searching a database based on a query having criteria that includes an indication of bias based on input by the user including binary feedback associated with another image of another user, an indication of the aggregate binary feedback data, and at least one of the user-defined classification or the predicted classification;

identifying a search result that satisfies the query, the search result being obtained from the database; and causing display, on a display device of the user device, a recommendation including at least an indication of the search result.

9. The method of claim 8, wherein the image is a color image, and predicting the classification for the characteristic comprising:

processing the color image through a multi-branched ML process comprising:

processing the color image with a first ML model to output a first classification indicative of a likelihood that the characteristic of the user has one of a plurality of possible classifications, wherein the predicted classification for the characteristic is generated based on at least the first classification.

10. The method of claim 9, wherein processing the color image through the multi-branched ML process comprises:

processing the color image with a VGG16 model to output a second classification indicative of a likelihood that the physical characteristic of the user has one of a plurality of possible classifications, wherein the prediction of the characteristic is generated based on a combination of the first and the second classifications.

11. The method of claim 10, wherein processing the color image through the multi-branched ML process comprises:

converting the color image to a grayscale image;

processing the grayscale image with a second model to output a third classification indicative of a likelihood that the physical characteristic of the user has one of a plurality of possible classifications, wherein the prediction of the physical characteristic is generated based on a combination of the first, the second, and the third classifications.

12. The method of claim 11, wherein processing the color image through the multi-branched ML process further comprises:

processing a grayscale representation of the color image with a third model to output a fourth classification indicative of a likelihood that the characteristic of the user has one of the plurality of possible classifications, wherein the prediction of the physical characteristic is generated based on a combination of the first, the second, the third, and the fourth classifications.

13. The method of claim 12, wherein the grayscale representation of the color image is produced by a process comprising:

processing the color image with a first U-Net model that segments a portion of the color image; and processing the segmented image with a second U-Net model that segments a portion of the user in the segmented image.

14. The method of claim 13, wherein predicting the classification for the characteristic comprises:

determining an average value for each classification; and determining a maximum value among the average values, the predicted classification for the characteristic being set to the maximum value.

15. The method of claim 8, wherein the user-defined data and the aggregate binary feedback are stored at a blockchain to enable verifying provenance of data utilized for the criteria.

16. The method of claim 8, wherein the query is formulated based on a plurality of contextual statements associated with the aggregate binary feedback.

17. The method of claim 8, wherein the ML process is trained based on a training set of images that includes the user.

18. A system comprising:

a processor; and a memory including instructions that, when executed by the processor, cause the system to:

set a user-defined classification of a physical characteristic of a user, the user-defined classification being input to a user device;

obtain an image captured by a camera device, the image being authorized for access by a plurality of authorized users;

aggregate binary feedback data submitted by the plurality of authorized users, the aggregate binary feedback data indicating a favorability of the image by the plurality of authorized users;

predict a classification for the physical characteristic by processing the image with a machine learning (ML) process, the predicted classification being generated independent of the user-defined classification;

search a database based on a query having criteria that includes:

an indication of the aggregate binary feedback data, an indication of the user-defined classification or the predicted classification, and an indication of binary feedback input by the user for another image including another user wearing an item of apparel or cosmetic;

identify a search result that satisfies the query, the search result being obtained from the database; and cause display, on a display device of the user device, a recommendation including at least an indication of the search result.

19. The system of claim 18, wherein the camera device is integrated in the user device, and the user device is a smartphone.

20. The system of claim 18, wherein the aggregate binary feedback is stored at a blockchain to enable verifying provenance of search result.

* * * * *